Patented Apr. 9, 1935

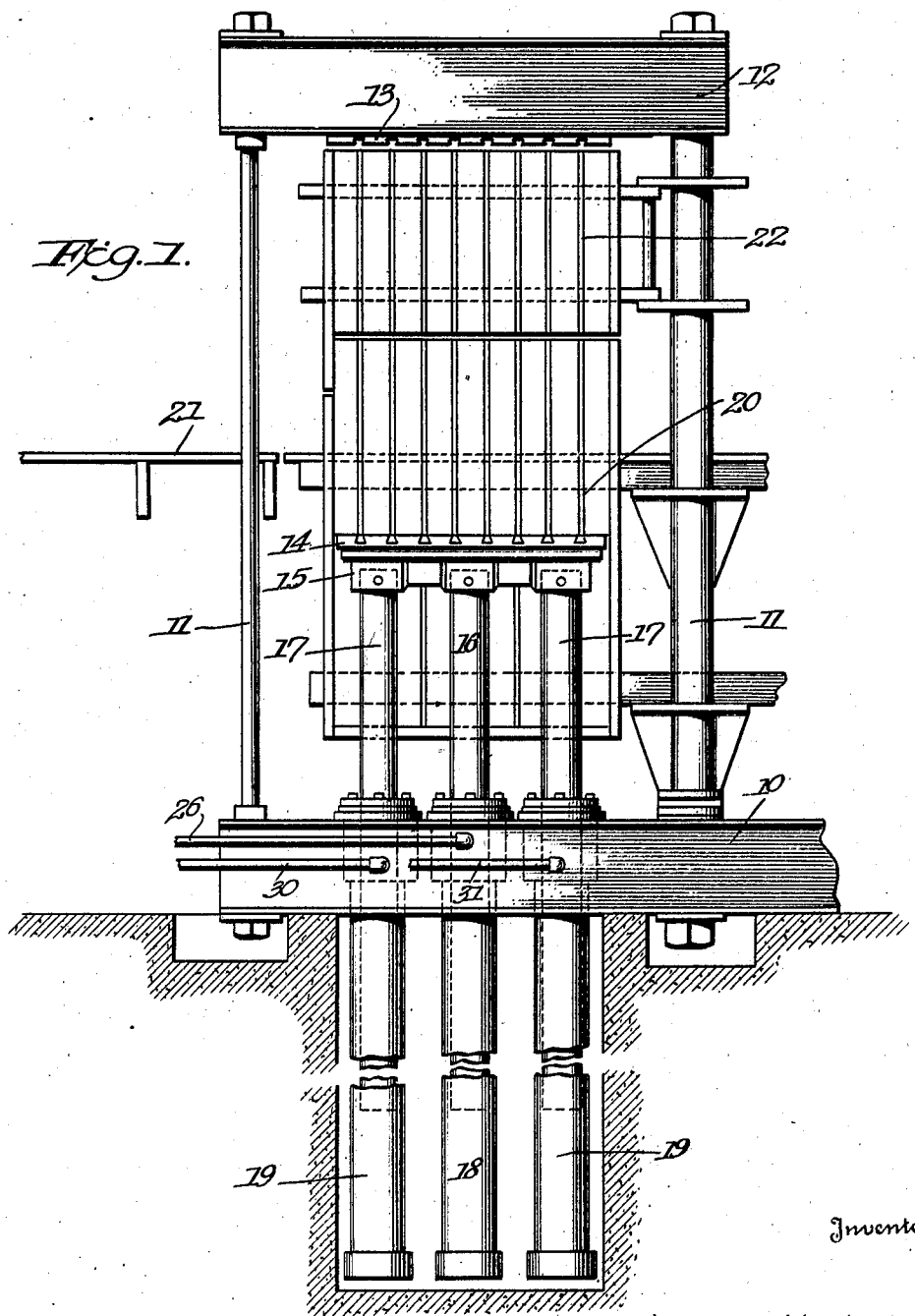

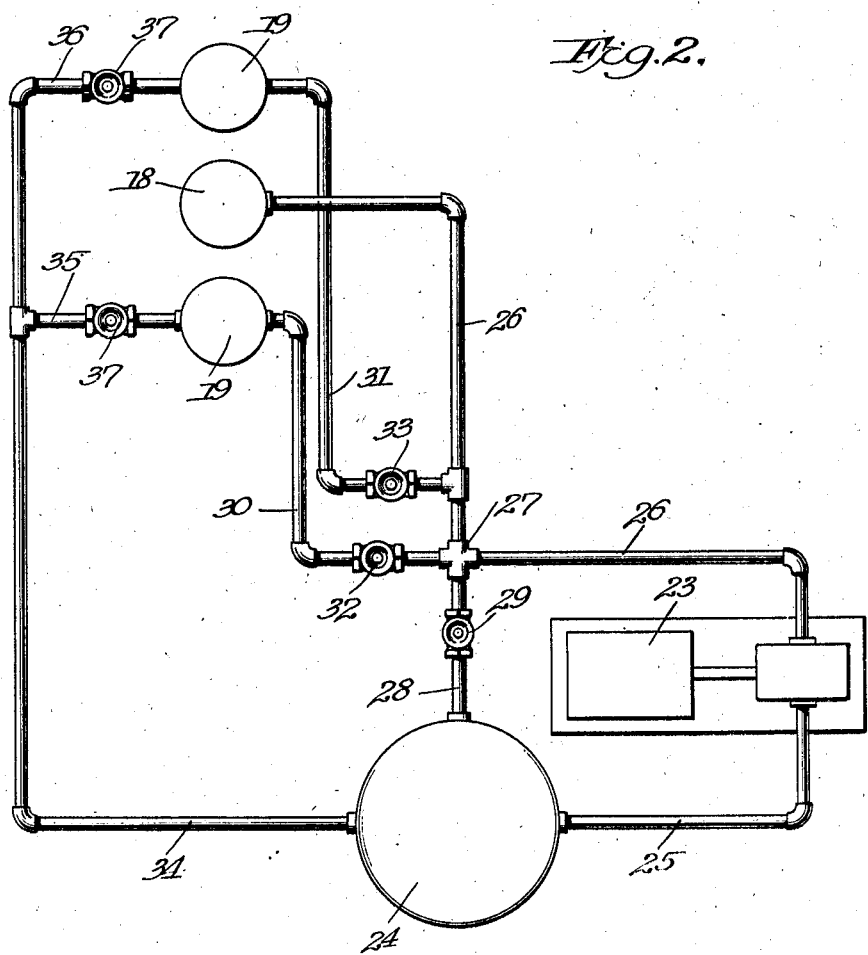

1,996,772

UNITED STATES PATENT OFFICE 1,996,772

BALING PRESS

Alexander S. Mackenzie, Houston, Tex., assignor to Anderson, Clayton & Company, Houston, Tex., a joint stock association of Texas Application September 12, 1932, Serial No. 632,833

3 Claims. (Cl. 100—71)

The present invention relates to a baling press.

Baling presses, and particularly cotton baling presses, include a movable platen which forms the bottom of the baling chamber, the platen usually being moved upwardly or toward a fixed head block to compact or compress the loose cotton or other material to the size and shape of a finished bale by means of a hydraulic ram centrally located with respect to the platen.

By the use of the structure described above, considerable difficulty is experienced in properly forming a bale, due to irregularities in the distribution of the cotton in the baling chamber. If there is more cotton in one end of the baling chamber than in the other, when the pressure builds up as the cotton is compressed, the end of the platen against the end of the bale having the greatest amount of cotton therein will be retarded while the other end will continue to travel against the lesser resistance, the result being a wedge shaped bale, larger at one end than at the other.

The principal object of the present invention is to provide a baling press capable, under all conditions, of producing bales which are of uniform size and shape.

Another object of the invention is to provide a baling press which is so constructed that the platen may be selectively actuated to apply the desired degree of pressure at the proper points of the platen to compress the material in the press to proper shape, regardless of whether or not the loose material to be formed into a bale is evenly distributed in the press.

Other objects and advantages of the invention will become apparent from the following specification and claims.

In the drawings, in which like numerals refer to like parts throughout the several views, Figure 1 is a side view of a baling press the foundation being shown in vertical section; and Figure 2 is a diagrammatic view showing the pressure fluid supply system used with the press.

The numeral 10 designates the base plate of the press which is provided with the usual tie rods 11 which support and hold a head block 12. A stationary platen 13 is secured to the head block and a movable platen 14 is fixed to a cross head 15 secured to a central or main ram or piston 16. Auxiliary rams or pistons 17 are secured to the cross head 15 on either side of the central ram 16 and the three pistons are mounted for reciprocation in separate cylinders, main ram 16 being mounted in a cylinder 18 and the auxiliary rams being mounted in cylinders 19, as shown. The baling chamber of the baling press comprises the usual lower portion 20 having side and end walls extending below the operating floor 21 and an upper portion 22 in which the completed bale is formed which portion is above the baling floor and is defined by the usual side and end doors.

Figure 2 shows the arrangement of piping and valves for controlling the flow of pressure fluid to the baling press. This system comprises a pump 23 which receives fluid from a tank 24 through a pipe line 25 and forces the fluid outwardly through a pipe line 26 to the ram cylinders. A connection 27 is included in the pipe line 26 to connect the latter directly with the tank 24 by a pipe line 28 in which is included a valve 29. From the connection 27, the line 26 extends to the central ram cylinder 18 and line 26 is connected to one of the auxiliary cylinders 19 by a line 30 which may extend from the connection 27. A line 31 is connected to the line 26 by a suitable fitting and extends to the other auxiliary ram cylinder 19. Valves 32 and 33 are provided in the lines 30 and 31, respectively. The auxiliary cylinders are also connected to the tank 24 by a pipe line 34 which joins branch lines 35 and 36, extending to each of the auxiliary cylinders 19. Check valves 37 are included in the branch lines 35 and 36 to prevent return flow of fluid from the auxiliary cylinders 19 to the tank 24 through the line 34.

In operation, the baling chambers 20 and 22 of the baling press are filled with cotton or other material in the usual manner. In order to move the platen 14 upwardly, the valves 29, 32 and 33 are closed and the pump 23 is placed in operation. Fluid will be withdrawn from the tank 24 by the pump 23 and will be forced through the pipe line 26 to the central cylinder 18, thereby forcing the platen 14 upwardly. In moving upwardly, the platen will carry the auxiliary rams 17 with it and in order to fill the cylinders 19 of the auxiliary rams 17, fluid will flow by gravity through the pipe line 34 and pipe lines 35 and 36, past the check valves 37, into the lower ends of the auxiliary cylinders 19.

The upward movement of the platen 14 will compress the loose cotton somewhat and if one end of the baling chambers contains more cotton than the other end, the end of the platen opposite the larger mass will be retarded somewhat. This action will be observed by the operator through the usual openings in the baling chamber and he may then open either valve 32 or 33 to admit fluid pressure from the pipe line 26 to the proper auxiliary cylinder 19 so that the end of the platen which has been retarded may be forced upwardly into level position. When the bale has been compressed to such a degree that it approaches maximum density, both valves 32 and 33 should be opened so that the auxiliary rams 17 may act with the central ram 16 to finally compress the bale. When the pump 23 has been stopped and the usual ties or fastenings have been applied to the bale, it will only be necessary to open the valve 29 to release the pressure from all three cylinders, permitting the fluid to return through the pipe lines 30 and 31 and pipe line 26 to the fitting 27, from which it will flow past the opened valve 29 and through the pipe line 28 to the tank 24. This will permit the movable plate 14 to drop and the bale may be removed from the press.

I claim:—

1. In a baling press, a central fluid pressure operated ram, equalizing fluid pressure operated rams, one on each side of the central ram, a movable platen mounted upon the rams, a supply tank, means to direct fluid by gravity from the supply tank to the equalizing rams, a pump receiving fluid from the supply tank, means to normally prevent return flow from the equalizing rams to the supply tank, and means to direct fluid pressure to the central ram and to selectively direct fluid pressure to either of the auxiliary rams.

2. In a baling press, a central fluid pressure operated ram, equalizing fluid pressure operated rams, one on each side of the central ram, a movable platen mounted upon the rams, a supply tank, a pump adapted to receive fluid from the supply tank, means to direct fluid pressure from the pump to the central ram, means to direct fluid by gravity to the auxiliary rams, means to normally prevent return flow from the auxiliary rams to the supply tank, means to selectively direct fluid pressure from the pump to the individual auxiliary rams, and means to provide return flow of fluid from the rams to the supply tank.

3. In a baling press having a movable platen, a central ram, a plurality of auxiliary equalizing rams, a fluid supply tank, a fluid pressure pump communicating with said fluid supply tank, said central ram communicating with said pump by a pipe line, said auxiliary rams communicating with said pipe line by individual pipe lines, valves in said last mentioned pipe lines to permit selective flow therethrough to said auxiliary rams, said auxiliary rams communicating with said supply tank by a separate gravity flow pipe line, and said first mentioned pipe line communicating with said supply tank by a valve controlled return flow pipe line.

ALEXANDER S. MACKENZIE.